US012638178B2

(12) United States Patent
Moura et al.

(10) Patent No.: US 12,638,178 B2
(45) Date of Patent: May 26, 2026

(54) APPARATUS AND METHOD FOR MITIGATING PARTICULATE ACCUMULATION ON A COMPONENT OF A GAS TURBINE

(71) Applicant: RTX Corporation, Farmington, CT (US)

(72) Inventors: Dennis M. Moura, South Windsor, CT (US); Carey Clum, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 237 days.

(21) Appl. No.: 17/882,315

(22) Filed: Aug. 5, 2022

(65) Prior Publication Data

US 2022/0381434 A1 Dec. 1, 2022

Related U.S. Application Data

(62) Division of application No. 16/208,993, filed on Dec. 4, 2018, now Pat. No. 11,415,319.

(60) Provisional application No. 62/607,599, filed on Dec. 19, 2017.

(51) Int. Cl.
*F23R 3/00* (2006.01)
*F01D 5/18* (2006.01)
(Continued)

(52) U.S. Cl.
CPC .............. *F23R 3/002* (2013.01); *F01D 25/32* (2013.01); *F23M 5/08* (2013.01); *F23R 3/06* (2013.01);
(Continued)

(58) Field of Classification Search
CPC .... F23R 3/002; F23R 3/02; F23R 3/04; F23R 3/06; F23R 2900/00004;
(Continued)

(56) References Cited

U.S. PATENT DOCUMENTS 4,896,510 A 1/1990 Foltz
9,046,269 B2 6/2015 Smith et al.
(Continued)

FOREIGN PATENT DOCUMENTS

WO 2016025054 A2 2/2016
WO 2016099662 A2 6/2016

OTHER PUBLICATIONS

European Office Action for European Application No. 18214255.4 Issued Oct. 21, 2020, 5 Pages.
(Continued)

*Primary Examiner* — Devon C Kramer
(74) *Attorney, Agent, or Firm* — CANTOR COLBURN LLP

(57) ABSTRACT

A gas turbine engine component assembly is provided. The gas turbine engine component assembly, comprising: a first component having a first surface, a second surface opposite the first surface, and a cooling hole extending from the second surface to the first surface through the first component; a second component having a first surface and a second surface, the first surface of the first component and the second surface of the second component defining a cooling channel therebetween in fluid communication with the cooling hole for cooling the second surface of the second component; and a particulate capture device attached to at least one of the first component and the second component, the particulate capture device configured to aerodynamically separate the airflow from the particulate.

8 Claims, 7 Drawing Sheets

(51) Int. Cl.

| | |
|---|---|
| ***F01D 25/32*** | (2006.01) |
| ***F23M 5/08*** | (2006.01) |
| ***F23R 3/06*** | (2006.01) |

(52) U.S. Cl.

CPC .......... *F01D 5/189* (2013.01); *F05D 2240/35* (2013.01); *F05D 2260/201* (2013.01); *F05D 2260/607* (2013.01); *F23R 2900/00004* (2013.01); *F23R 2900/03043* (2013.01); *F23R 2900/03044* (2013.01)

(58) Field of Classification Search

CPC .. F23R 2900/03042; F23R 2900/03043; F23R 2900/03044; F05D 2240/35; F05D 2260/201; F05D 2260/202; F05D 2260/203; F05D 2260/204; F05D 2260/205; F05D 2260/221; F05D 2260/2212; F05D 2260/2214; F05D 2260/22141; F05D 2260/231; F05D 2260/232; F02C 7/05; B64D 2033/022; B64D 2033/0246

See application file for complete search history.

(56) References Cited

U.S. PATENT DOCUMENTS

| | | | |
|---|---|---|---|
| 10,731,855 | B2 | 8/2020 | Zelesky et al. |
| 2009/0081024 | A1 | 3/2009 | Tibbott |
| 2016/0061451 | A1 | 3/2016 | Dudebout et al. |
| 2016/0123154 | A1 | 5/2016 | Manning et al. |
| 2016/0153363 | A1 | 6/2016 | Zysman et al. |
| 2016/0333735 | A1 | 11/2016 | Bunker |
| 2017/0114720 | A1 | 4/2017 | Stone et al. |
| 2017/0191417 | A1 | 7/2017 | Bunker et al. |
| 2017/0335716 | A1 | 11/2017 | Bergholz et al. |
| 2019/0071985 | A1 | 3/2019 | Park |
| 2019/0086084 | A1 | 3/2019 | Clum et al. |
| 2019/0186738 | A1 | 6/2019 | Moura et al. |

OTHER PUBLICATIONS

Extended European Search Report for Application No. 18214255.4 Issued Jul. 12, 2019, 11 Pages.

Intention to Grant for European Application No. 18214255.4 Issued Jul. 15, 2021, 37 Pages.

Partial European Search Report for Application No. 18214255.4; Issued Mar. 14, 2019, 12 Pages.

APPARATUS AND METHOD FOR MITIGATING PARTICULATE ACCUMULATION ON A COMPONENT OF A GAS TURBINE

CROSS-REFERENCE TO RELATED APPLICATIONS

This application is a divisional of U.S. application Ser. No. 16/208,993 filed Dec. 4, 2018, which claims the benefit of U.S. Provisional Application No. 62/607,599 filed Dec. 19, 2017, the contents each of which are incorporated herein by reference in their entirety.

BACKGROUND

The subject matter disclosed herein generally relates to gas turbine engines and, more particularly, to method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand and dirt.

SUMMARY

According to one embodiment, a gas turbine engine component assembly is provided. The gas turbine engine component assembly, comprising: a first component having a first surface, a second surface opposite the first surface, and a cooling hole extending from the second surface to the first surface through the first component; a second component having a first surface and a second surface, the first surface of the first component and the second surface of the second component defining a cooling channel therebetween in fluid communication with the cooling hole for cooling the second surface of the second component; and a particulate capture device attached to at least one of the first component and the second component, the particulate capture device configured to aerodynamically separate the airflow from the particulate.

In addition to one or more of the features described above, or as an alternative, further embodiments may include a particulate capture device attached to the first component, the particulate capture device being configured to capture airflow and particulate in an airflow path proximate the second surface of the first component, aerodynamically separate the airflow from the particulate, and expel the airflow through the cooling hole towards the second surface of the second component.

In addition to one or more of the features described above, or as an alternative, further embodiments may include that the particulate capture device further comprises a scoop portion projecting outward from the second surface of the first component and into the airflow path proximate the second surface of the first component, wherein the scoop portion is configured to capture airflow and particulate flowing through the airflow path and direct the airflow and particulate through a first orifice and into a chamber of the particulate capture device.

In addition to one or more of the features described above, or as an alternative, further embodiments may include that the particulate capture device is shaped to turn the airflow between the first orifice and the cooling hole such that air particulate is forced to separate from the airflow within the chamber.

In addition to one or more of the features described above, or as an alternative, further embodiments may include that an area of the first orifice is greater than or equal to three times an area of the cooling hole.

In addition to one or more of the features described above, or as an alternative, further embodiments may include that the cooling hole is located away from the first orifice at a distance less than or equal to three times a height of the first orifice.

In addition to one or more of the features described above, or as an alternative, further embodiments may include a particulate capture device attached to the second component, the particulate capture device being configured to receive at least one of airflow and particulate from the cooling hole, wherein the particulate capture device is configured to aerodynamically separate the airflow from the particulate, and direct the airflow towards a cooling hole of the second component.

In addition to one or more of the features described above, or as an alternative, further embodiments may include that the particulate capture device further comprises: a collection well shaped to redirect the airflow such that airflow separates from the particulate and the airflow continues to flow to the cooling hole of the second component.

In addition to one or more of the features described above, or as an alternative, further embodiments may include that the particulate capture device further comprises: a dam projecting out from the second surface of the second component, wherein the dam extends the collection well away from the second surface of the second component, and wherein the collection well is configured to redirect the airflow around the dam.

In addition to one or more of the features described above, or as an alternative, further embodiments may include a particulate capture device attached to the second component, the particulate capture device being configured to receive at least one of airflow and particulate from the cooling hole, wherein the particulate capture device is configured to aerodynamically separate the airflow from the particulate, and direct the airflow towards a cooling hole of second component.

According to another embodiment, a shell of a combustor for use in a gas turbine engine is provided. The shell comprising: a combustion chamber of the combustor, the combustion chamber having a combustion area; a combustion liner having an inner surface, an outer surface opposite the inner surface, and a primary aperture extending from the outer surface to the inner surface through the combustion liner; a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity; and a particulate capture device attached to at least one of the combustion liner and the heat shield panel, the particulate capture device configured to aerodynamically separate the airflow from the particulate.

In addition to one or more of the features described above, or as an alternative, further embodiments may include a particulate capture device attached to the combustion liner, the particulate capture device being configured to capture airflow and particulate in an airflow path proximate the outer surface, aerodynamically separate the airflow from the particulate, and expel the airflow through the primary aperture towards the heat shield heat shield panel.

In addition to one or more of the features described above, or as an alternative, further embodiments may include that the particulate capture device further comprises: a scoop portion projecting outward from the outer surface of the combustion liner and into the airflow path proximate the outer surface, wherein the scoop portion is configured to capture airflow and particulate flowing through the airflow path and direct the airflow and particulate through a first orifice and into a chamber of the particulate capture device.

In addition to one or more of the features described above, or as an alternative, further embodiments may include that the particulate capture device is shaped to turn the airflow between the first orifice and the primary aperture such that air particulate is forced to separate from the airflow within the chamber.

In addition to one or more of the features described above, or as an alternative, further embodiments may include that an area of the first orifice is greater than or equal to three times an area of the primary aperture.

In addition to one or more of the features described above, or as an alternative, further embodiments may include that the primary apertures are located away from the first orifice at a distance less than or equal to three times a height of the first orifice.

In addition to one or more of the features described above, or as an alternative, further embodiments may include that a particulate capture device attached to the heat shield panel, the particulate capture device being configured to receive at least one of airflow and particulate from the primary aperture, wherein the particulate capture device is configured to aerodynamically separate the airflow from the particulate, and direct the airflow towards the secondary apertures.

In addition to one or more of the features described above, or as an alternative, further embodiments may include that the particulate capture device further comprises: a collection well shaped to redirect the airflow such that airflow separates from the particulate and the airflow continues to flow to the secondary aperture.

In addition to one or more of the features described above, or as an alternative, further embodiments may include that the particulate capture device further comprises: a dam projecting out from the second surface of the heat shield heat shield panel, wherein the dam extends the collection well away from the second surface, and wherein the collection well is configured to redirect the airflow around the dam.

In addition to one or more of the features described above, or as an alternative, further embodiments may include a particulate capture device attached to the heat shield panel, the particulate capture device being configured to receive at least one of airflow and particulate from the primary aperture, wherein the particulate capture device is configured to aerodynamically separate the airflow from the particulate, and direct the airflow towards the secondary apertures.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 3A:
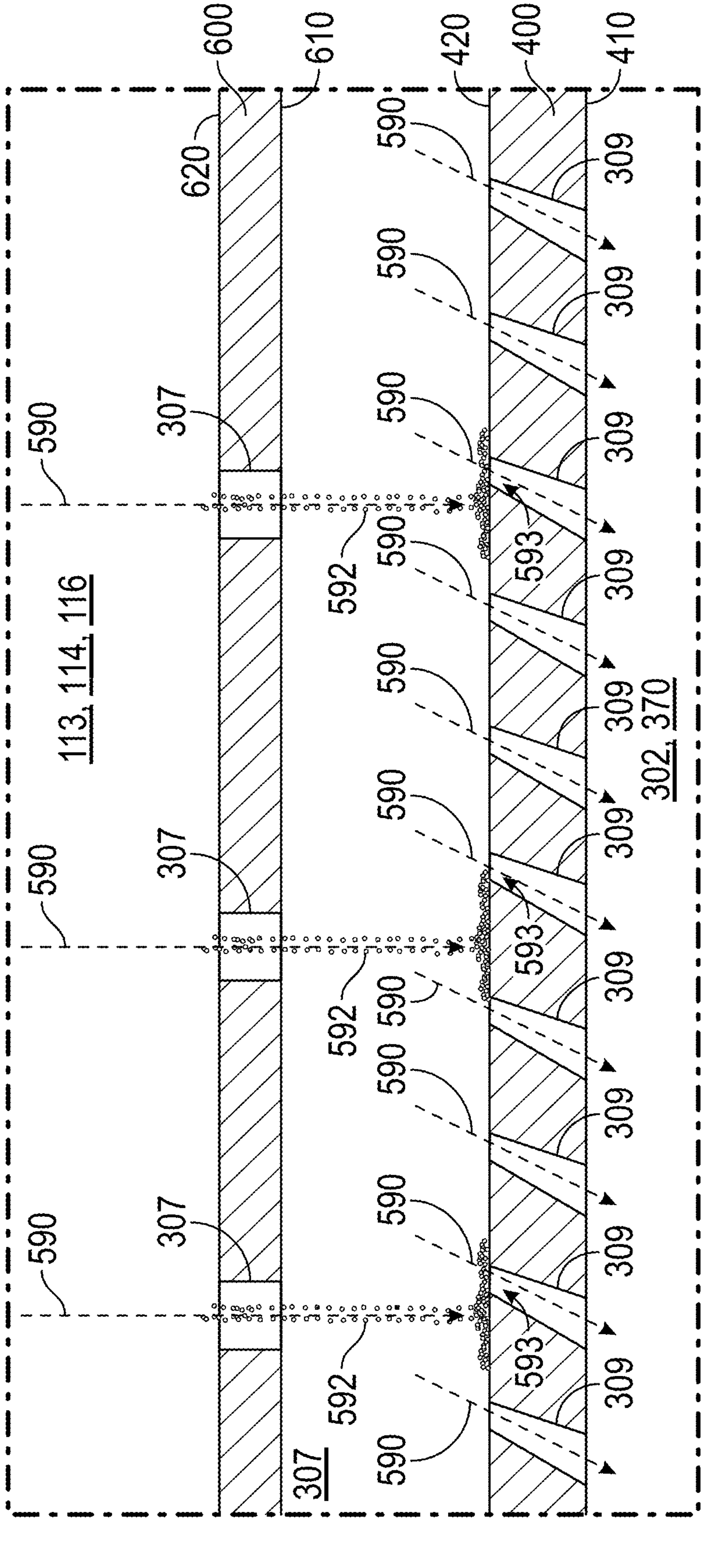
Figure 3B:
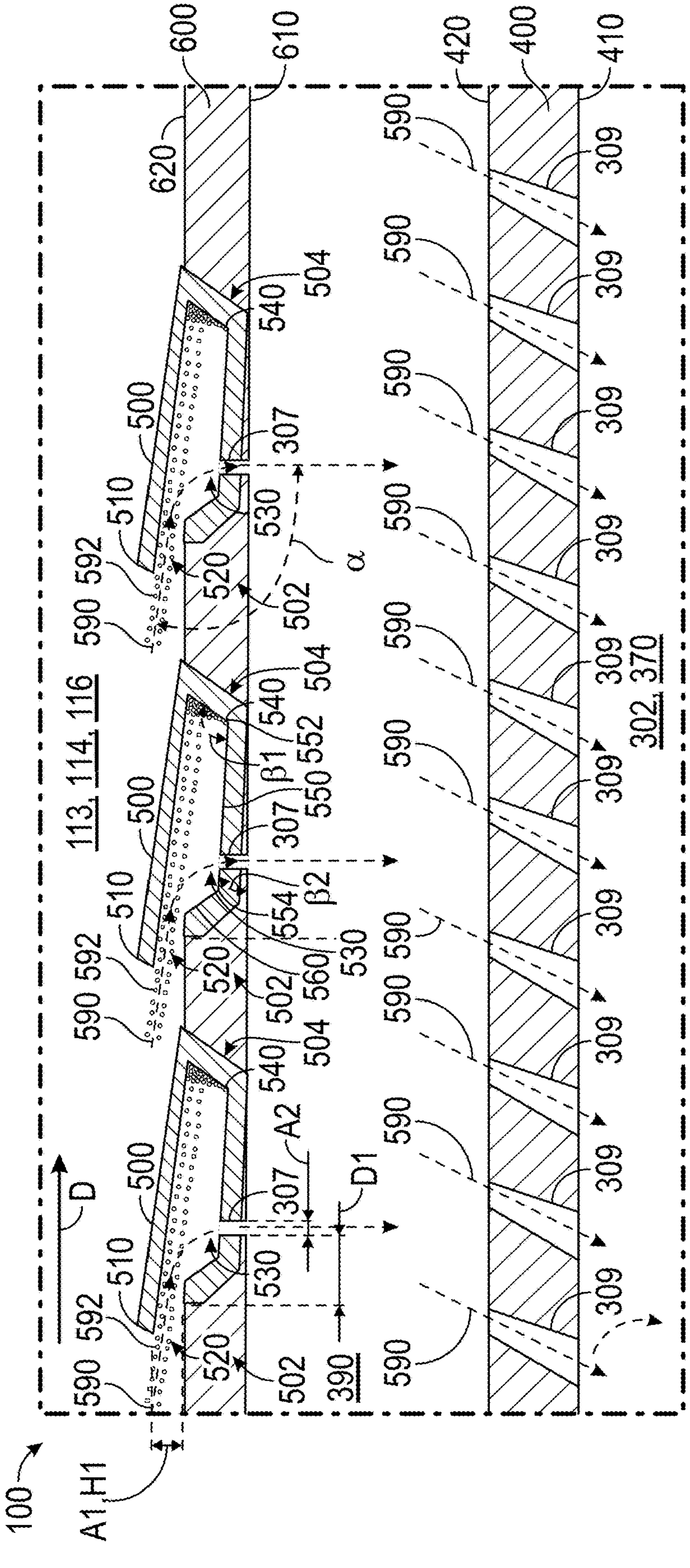
Figure 4A:
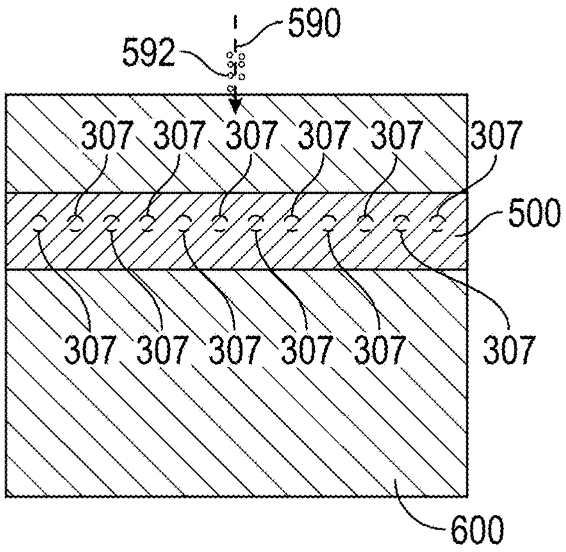
Figure 4B:
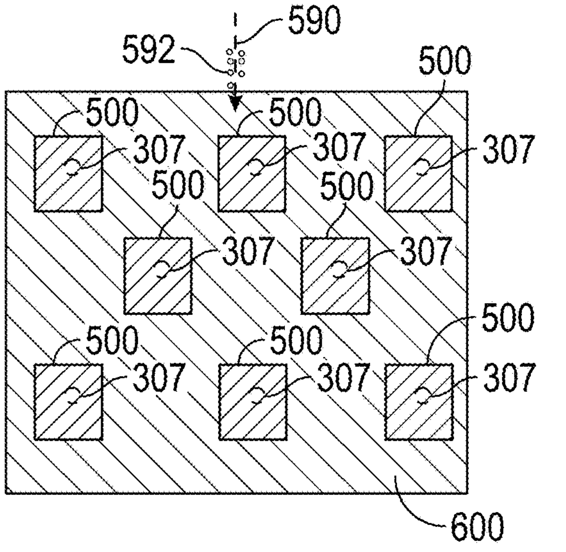
Figure 4C:
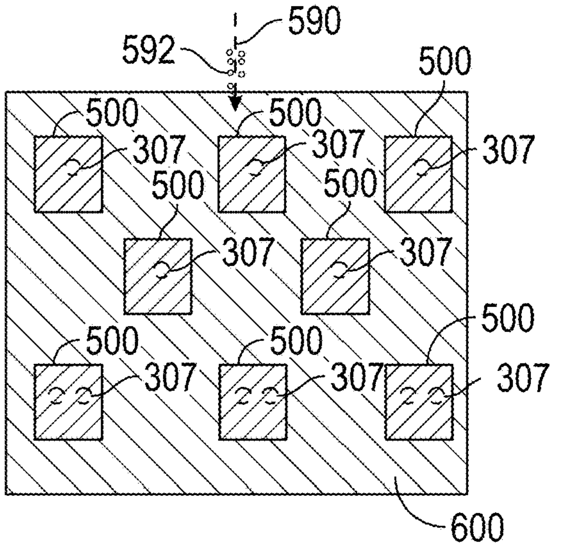
Figure 5:
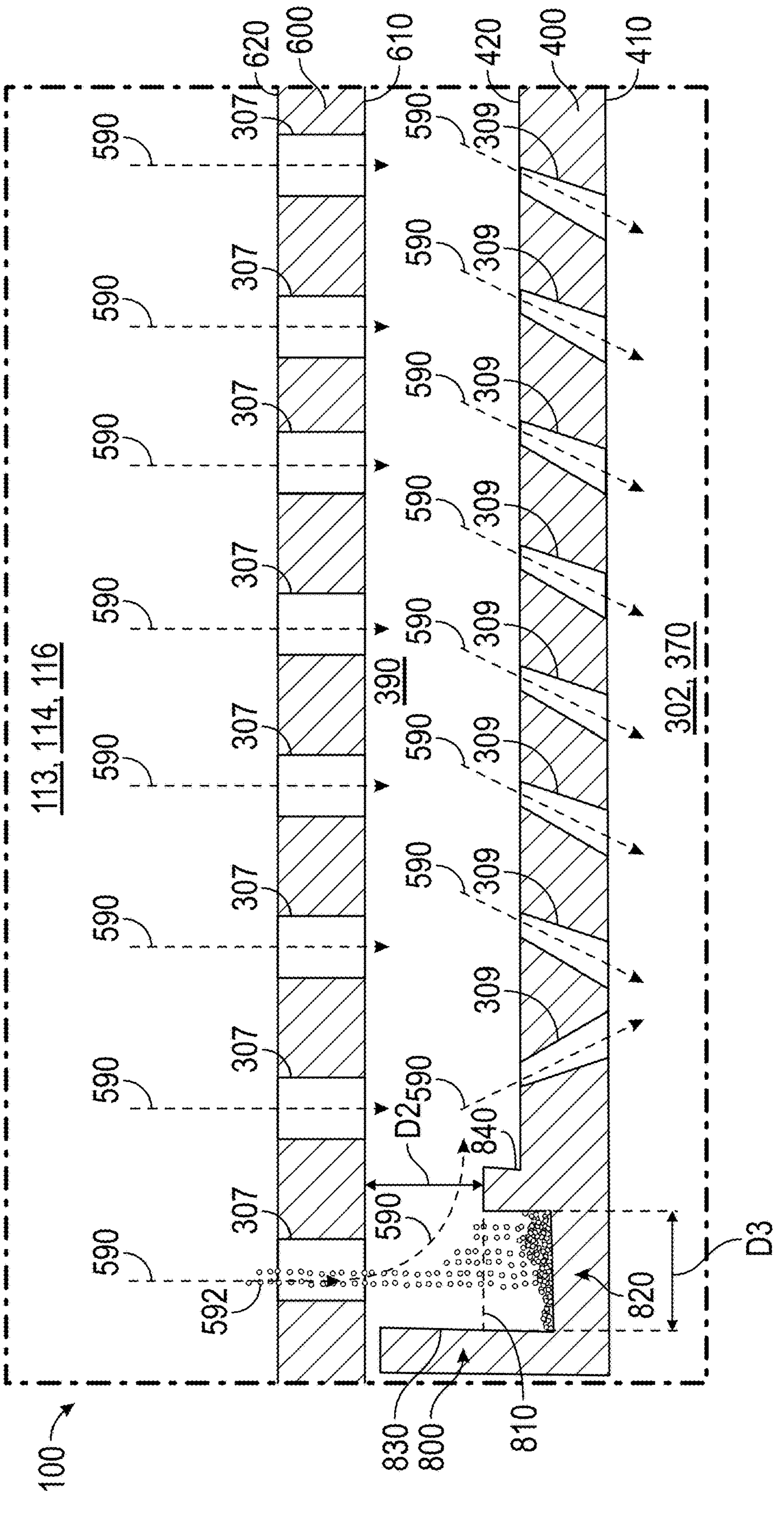
Figure 6:
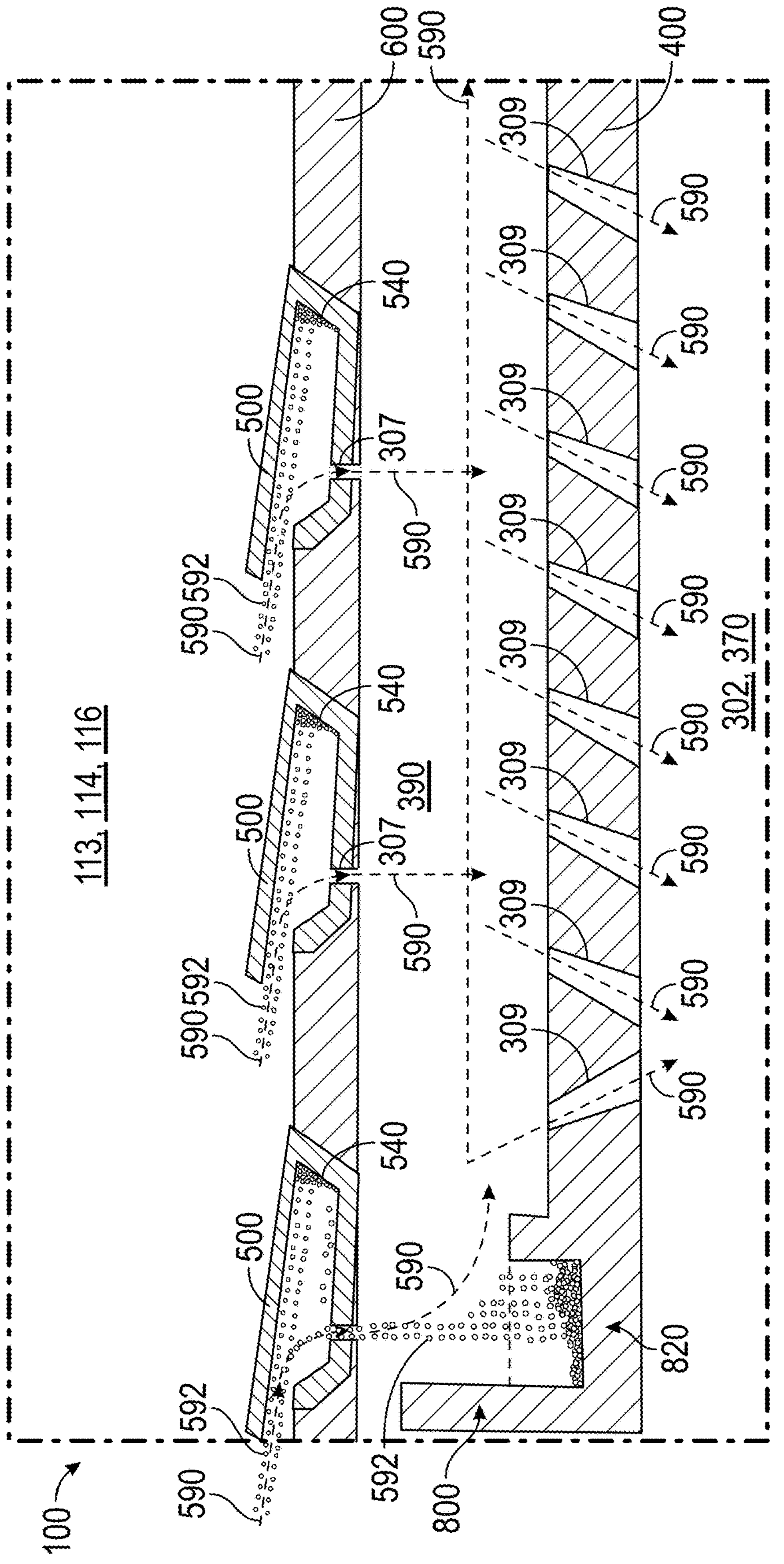

FIG. 3*a* is an enlarged cross-sectional illustration of a heat shield panel and combustion liner of a combustor, in accordance with an embodiment of the disclosure;

FIG. 3*b* is a cross-sectional illustration of a particulate capture system for a combustor of a gas turbine engine, in accordance with an embodiment of the disclosure;

FIG. 4*a* is a configuration of a particulate capture system for a combustor of a gas turbine engine, in accordance with an embodiment of the disclosure;

FIG. 4*b* is a configuration of a particulate capture system for a combustor of a gas turbine engine, in accordance with an embodiment of the disclosure;

FIG. 4*c* is a configuration of a particulate capture system for a combustor of a gas turbine engine, in accordance with an embodiment of the disclosure;

FIG. 5 is a cross-sectional illustration of a particulate capture system for a combustor of a gas turbine engine, in accordance with an embodiment of the disclosure; and FIG. 6 is a cross-sectional illustration of a particulate capture system for a combustor of a gas turbine engine, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
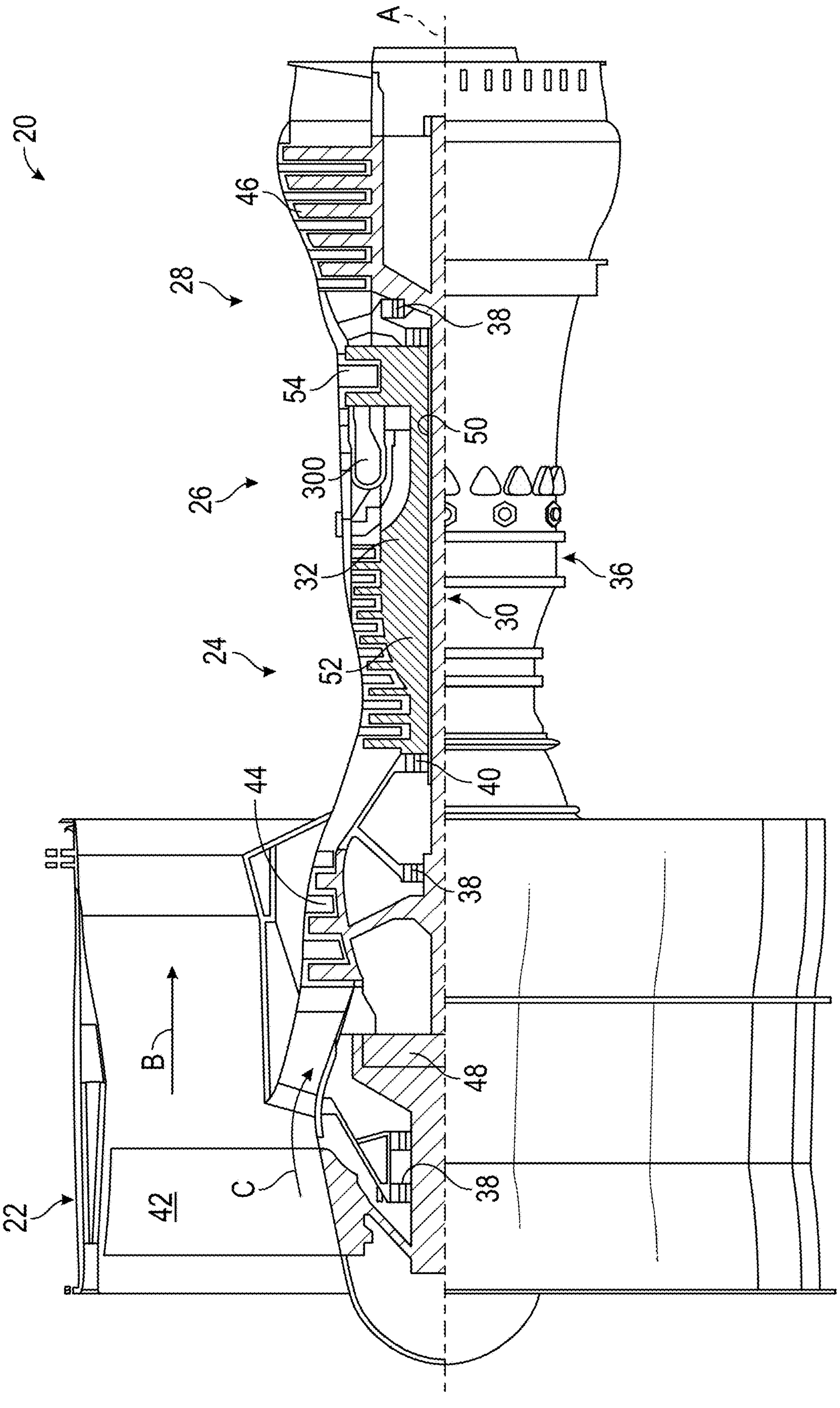
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as “bucket cruise Thrust Specific Fuel Consumption (‘TSFC’)”—is the industry standard parameter of lbm of fuel being burned divided by lbf of thrust the engine produces at that minimum point. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45. “Low corrected fan tip speed” is the actual fan tip speed in ft/sec divided by an industry standard temperature correction of $[(\text{Tram °R})/(518.7\text{°R})]^{0.5}$. The “Low corrected fan tip speed” as disclosed herein according to one non-limiting embodiment is less than about 1150 ft/second (350.5 m/sec).

Figure 2:
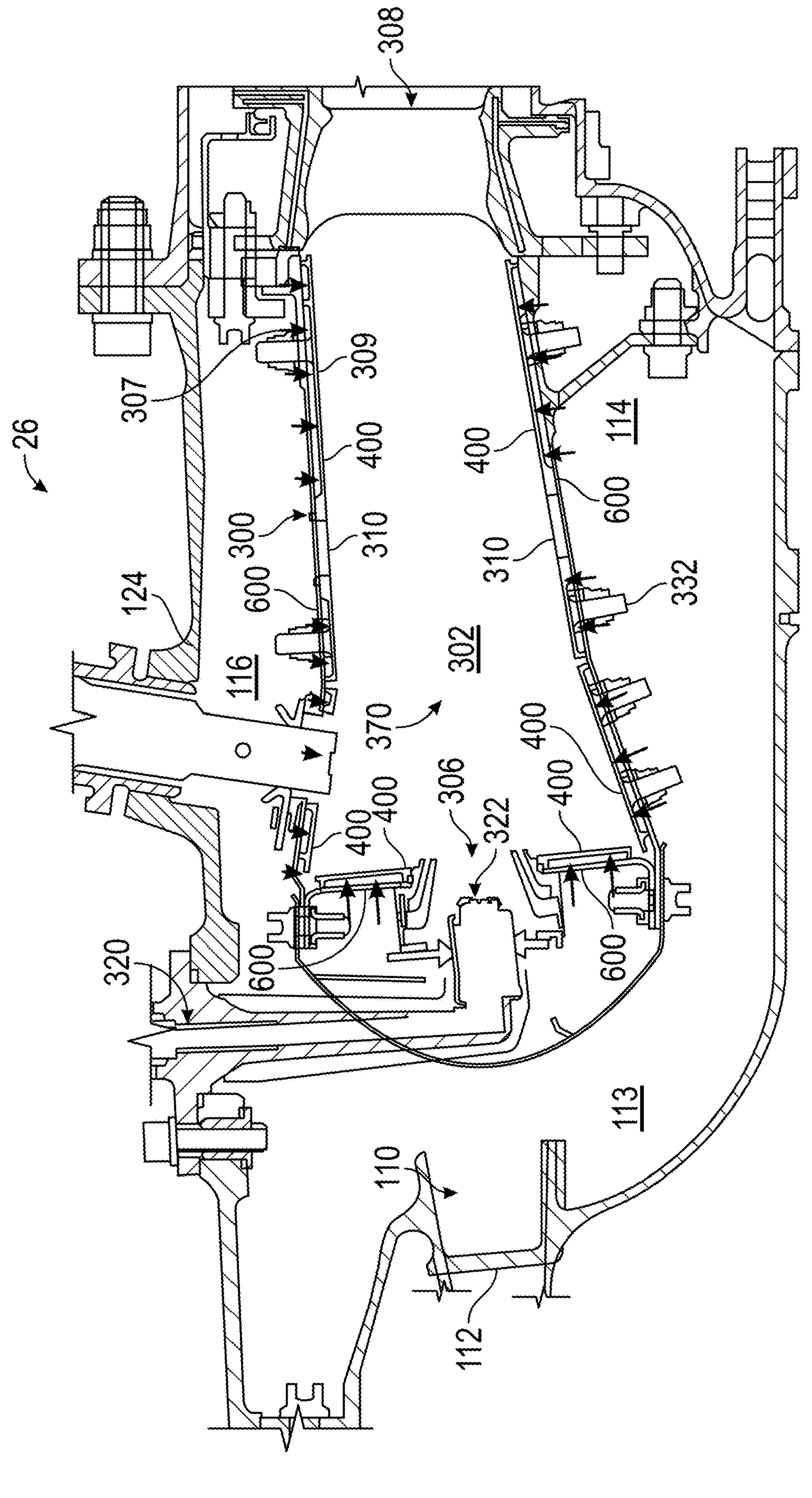
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

As shown in FIG. 2, compressor air is supplied from a compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

The combustor 300, as shown in FIG. 2, includes multiple heat shield panels 400 that are attached to the combustion liner 600 (See FIG. 3*a*). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partial enclose a combustion area 370 within the combustion chamber 302 of the combustor 300.

Referring now to FIGS. 3*a*, 3*b*, and 4*a*-4*c* with continued reference to FIGS. 1 and 2. FIG. 3*a* illustrates a heat shield panel 400 and combustion liner 600 of a combustor (see FIG. 1) of a gas turbine engine (see FIG. 1). The heat shield panel 400 and the combustion liner 600 are in a facing spaced relationship. FIG. 3*b* shows a particulate capture system 100 for a combustor 300 (see FIG. 1) of a gas turbine engine 20 (see FIG. 1), in accordance with an embodiment of the present disclosure. The heat shield panel 400 includes a first surface 410 oriented towards the combustion area 370 of the combustion chamber 302 and a second surface 420 first surface opposite the first surface 410 oriented towards the combustion liner 600. The combustion liner 600 has an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400.

Each of the primary apertures 307 extend from the outer surface 620 to the inner surface 610 through the combustion liner 600. Each of the primary apertures 307 fluidly connects the impingement cavity 390 to at least one of the inner diameter branch 114 and the outer diameter branch 116. The heat shield panel 400 may include one or more secondary apertures 309 configured to allow airflow 590 from the impingement cavity 390 to the combustion area 370 of the combustion chamber 302.

Each of the secondary apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3*a*, particulate 592 may accompany the airflow 590 flowing into the impingement cavity 390. Particulate 592 may include but are not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3*a*. Particulate 592 collecting upon the second surface 420 of the heat shield panel 400 reduces the cooling efficiency of airflow 590 impinging upon the second surface 420, and thus may increase local temperatures of the heat shield panel 400 and the combustion liner 600. Particulate 592 collection upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage.

The combustion liner 600 may include a combustion liner particulate capture device 500 configured to turn airflow 590 a selected angle $\alpha 1$ such that particulate 592 separates from the airflow 590. In an embodiment the selected angle $\alpha 1$ may be about 90°. Advantageously, the addition of a combustion liner particulate capture device 500 to the combustion liner 600 may help reduce the amount of particulate 592 entering the impingement cavity 390 and collecting on the second surface 420 of the heat shield panel 400, as seen in FIG. 3*b*. The combustion liner 600 may include one or more combustion liner particulate capture devices 500, as seen in FIG. 3*b*. The combustion liner particulate capture device 500 is attached to the combustion liner 600. The combustion liner particulate capture device 500 may be embedded in the combustion liner 600, as seen in FIG. 3*b*. The combustion liner particulate capture device 500 is configured to direct airflow 590 and particulate 592 proximate the outer surface 620 into the combustion liner particulate capture device 500, aerodynamically separate the airflow 590 and particulate 592, and expel the airflow 590 through at least one of the primary apertures 307 towards the one or more heat shield panels 400.

The combustion liner particulate capture device 500 may include a scoop portion 510 projecting outward from the outer surface 620 of the combustion liner 600 and into an airflow path D of the inner diameter branch 114 or the outer diameter branch 116. The scoop portion 510 is configured to capture airflow 590 and particulate 592 flowing through the inner diameter branch 114 and/or the outer diameter branch 116 and direct the airflow 590 and particulate 592 through a first orifice 520 and into a chamber 530 of the combustion liner particulate capture device 500. The first orifice 520 may be located at a forward end 502 of the combustion liner particulate capture device 500. The first orifice 520 may provide an opening to the chamber 530 in the direction of the airflow path D, as seen in FIG. 3*b*. It is understood that the first orifice 520 may provide an opening to the chamber 530 in any direction other than in the direction of the airflow path D. In a non-limiting example, the first orifice 520 may provide an opening to the chamber 530 in a direction opposite the direction of the airflow path D. The first orifice 520 may include one or more slots and/or holes. The first orifice 520 may include one or more slots and/or holes. Although illustrated as a circle, the first orifice 520 may have various shapes including but not limited to, an oval, triangle, a square, a rectangle, pentagon, hexagon, or any other shape. In an embodiment, an area A1 of the first orifice 520 is larger than an area A2 of the primary apertures 307. In an embodiment, the area A1 of the first orifice 520 a combustion liner particulate capture device 500 is at least three times as large as the area A2 of the primary aperture 307 fluidly connected to the first orifice 520 through the combustion liner particulate capture device 500. In an embodiment, the area A1 of the first orifice 520 of a combustion liner particulate capture device 500 is at least three times as large as the sum of areas A2 of the primary apertures 307 fluidly connected to the first orifice 520 through the combustion liner particulate capture device 500. Advantageously, having an area A1 of the first orifice 520 larger than the area A2 of a primary aperture 307 helps ensure that a rate of airflow into the impingement cavity 390 is not reduced or inhibited by flowing through the combustion liner particulate capture device 500. The airflow 590 carries particulates 592 as the airflow 590 is directed into the chamber 530. The scoop portion 510 is configured to direct the airflow 590 and particulates 592 towards a collection backstop 540 located at an aft end 504 of the combustion liner particulate capture device 500. As seen is FIG. 3*b*, the aft end 504 is opposite the forward end 502. The collection backstop 540 is shaped to redirect the airflow 590 such that the airflow 590 separates from the particulates 592 and the airflow 590 continues to flow to the primary aperture 307. The collection backstop 540 will redirect the airflow 590 through the primary aperture 307 while allowing the particulates 592 to collect at the collection backstop 540. As mentioned above, the combustion liner particulate capture device 500 is configured to turn airflow 590 a selected angle α1 such that particulate 592 separates from the airflow 590. Due to the mass size of the particulate 592, the particulate 592 cannot make the turn from the first orifice 520 to the primary aperture 307 and the momentum of the particulate 592 separates the particulate 592 from the airflow 590 in the chamber 530 and carries the particulate 592 into the collection backstop 540. In an embodiment the selected angle α1 may be about 90°. Advantageously, by aerodynamically separating out particulate 592 using the collection backstop 540, buildup of particulate 592 on the second side 420 of the heat shield panel 400 may be reduced. In an embodiment, the chamber 530 fluidly connects to the primary aperture 307 at a location that is at a distance D1 away from first orifice 520 that is no greater than three times a height H1 of the first orifice 520.

The combustion liner particulate capture device 500 may include a base portion 550 located opposite the scoop portion 510. The collection backstop 540 extending from the base portion 550 to the scoop portion 510. The collection back stop 540 may be at an obtuse angle β1 relative to the base portion 550, as illustrated in FIG. 3B. Advantageously, the obtuse angle β1 between the collection back stop 540 and the base portion 550 allows for an increased area for collection of particulate 592. The combustion liner particulate capture device 500 may also include a front wall 560 located at or proximate the forward end 502 of the particulate collection device 500. The front wall 560 may be located opposite the collection back stop 540 as illustrated in FIG. 3B. The front wall 560, the scoop portion 510, the base portion 550, and the collection backstop 540 form the chamber 530 of the combustion liner particulate capture device 500, as illustrated in FIG. 3B. The front wall 560, the scoop portion 510, the base portion 550, and the collection backstop 540 may each be linear in shape, as illustrated in FIG. 3B. The primary orifice 307 may be located closer to the front wall 560 than to the collection backstop 540, as illustrated in FIG. 3B. Advantageously, the primary orifice 307 being located closer to the front wall 560 than to the collection backstop 540 allows for an increased area for collection of particulate 592 in the chamber 530 of the combustion liner particulate capture device 500. The base portion 550 may be oriented at an inclined angle β2 such that an aft end 552 of the base portion 550 is closer to the inner surface 610 than a forward end 554 of the base portion 550. Advantageously, the base portion 550 being oriented at an inclined angle β2 such that the aft end 552 of the base portion 550 is closer to the inner surface 610 than the forward end 554 of the base portion 550, helps to maintain the particulate 592 closer towards the collection backstop 540 in the chamber 530 due to the inclined angle β2.

FIGS. 4*a*, 4*b*, and 4*c* illustrate different implementations and configurations of one or more combustion liner particulate capture devices 500. In a first example, as shown in FIG. 4*a*, the combustion liner particulate capture device 500 may be a single device that extends circumferentially around the combustion liner 600. It is understood that FIG. 4*a* is a non-limiting illustration and there may be more than one rows of the single device circumferentially around the combustion liner 600. There may be one or more first orifices 520 (see FIG. 3*b*) that direct airflow 590 along with the particulates 592 into a single chamber 530 (see FIG. 3*b*), where the airflow 590 and the particulates 592 are aerodynamically separated as described above. Then the airflow 590 may exit the chamber 530 (see FIG. 3*b*) through one or more primary apertures 307 in the combustion liner 600, as seen in FIG. 4*a*.

In a second example, as shown in FIG. 4*b*, the combustion liner 600 may include one or more combustion liner particulate capture devices 500 in a staggered arrangement circumferentially around the combustion liner 600. It is understood that FIG. 4*b* is a non-limiting illustration and the combustion liner 600 may include one or more combustion liner particulate capture devices 500 in-line with each other as opposed to being staggered with each other. Each combustion liner particulate capture device 500 may have a first orifices 520 (see FIG. 3*b*) that directs airflow 590 along with the particulates 592 into a chamber 530 (see FIG. 3*b*), where the airflow 590 and the particulates 592 are aerodynamically separated as described above. Then the airflow 590 may exit the chamber 530 (see FIG. 3*b*) through a primary apertures 307 in the combustion liner 600, as seen in FIG. 4*b*.

In a third example, as shown in FIG. 4*c*, the combustion liner 600 may include one or more combustion liner particulate capture device 500 in a staggered arrangement circumferentially around the combustion liner 600. It is understood that FIG. 4*c* is a non-limiting illustration and the combustion liner 600 may include one or more combustion liner particulate capture devices 500 in-line with each other as opposed to being staggered with each other. Each combustion liner particulate capture device 500 may have a first orifices 520 (see FIG. 3*b*) that directs airflow 590 along with the particulates 592 into a chamber 530 (see FIG. 3*b*), where the airflow 590 and the particulates 592 are aerodynamically separated as described above. Then the airflow 590 may exit the chamber 530 (see FIG. 3*b*) through one or more primary apertures 307 in the combustion liner 600, as seen in FIG. 4*c*.

Referring now to FIG. 5 with continued reference to FIGS. 1, 2, 3*a*, 3*b*, and 4*a*-4*c*. FIG. 5 shows a particulate capture system 100 for a combustor 300 (see FIG. 1) of a gas turbine engine 20 (see FIG. 1), in accordance with an embodiment of the present disclosure. FIG. 5 illustrates a heat shield panel 400, a combustion liner 600, and a heat shield panel particulate capture device 800. The heat shield panel 400 includes a first surface 410 oriented towards the combustion area 370 of the combustion chamber 302 and a second surface 420 first surface opposite the first surface 410 oriented towards the combustion liner 600. The combustion liner 600 includes an inner surface 610 and an outer surface 620 opposite the inner surface 610. The inner surface 610 is oriented toward the heat shield panel 400. The outer surface

620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 fluidly connects the inner surface 610 and the outer surface 620. The heat shield panel 400 includes a plurality of secondary apertures 309 configured to allow airflow 590 from the impingement cavity 390 to the combustion area 370 of the combustion chamber 302. Each of the secondary apertures 309 fluidly connects the first surface 410 and the second surface 420. Airflow 590 flowing into the impingement cavity 390 impinges on the second surface 420 of the heat shield panel 400 and absorbs heat from the heat shield panel 400 as it impinges on the second surface 420. As seen in FIG. 5, particulates 592 may accompany the airflow 590 flowing into the impingement cavity 390. Particulate 592 may include but is not limited to dirt, smoke, soot, volcanic ash, or similar airborne pollutant known to one of skill in the art. As the airflow 590 and particulates 592 impinge upon the second surface 420 of the heat shield panel 400, the particulates 592 may begin to collect on the second surface 420, as was seen and described above in reference to FIG. 3*a*.

Advantageously, the addition of a heat shield panel particulate capture device 800 to the heat shield panel 400 may help reduce the amount of the particulates 592 entering the combustion area 370 of the combustion chamber 302 and also may help reduce the amount of particulate 592 collecting on the second surface 420 of the heat shield panel 400, as was seen in FIG. 3*b* above. The heat shield panel 400 may include one or more heat shield panel particulate capture devices 800, as seen in FIG. 3*b*. The heat shield panel particulate capture device 800 may be formed in the second surface 420 as shown in FIG. 5 or may be attached to the second surface 420. The heat shield panel particulate capture device 800 is configured to receive at least one of the airflow 590 and particulate 592 from the one or more primary apertures 307. The heat shield panel particulate capture device 800 may be located in line with one or more of the primary apertures 307 such that the airflow 590 and particulate 592 from the one or more primary apertures 307 are directed through a first opening 810 into a collection well 820.

The heat shield panel particulate capture devices 800 may include a sealing wall 830 projecting away from the second surface 420 of the heat shield panel 400 and into the impingement cavity 390. The sealing wall 830 may seal the impingement cavity 390 from another cavity. The sealing wall 830 is configured to direct the airflow 590 and particulates 592 through the opening 810 and into the collection well 820 of the heat shield panel particulate capture device 800. Although FIG. 5 illustrates a sealing wall 830 heat shield panel particulate capture devices 800, the sealing wall 830 may not be required. For example, the dam 840 may encircle the collection well 820. The collection well 820 is shaped to redirect the airflow 590 and not the particulates 592 such that airflow 590 separates from the particulates 592. The collection well 820 will redirect the airflow 590 around a dam 840 projecting out from the second surface 420 of the heat shield panel 400 and into the impingement cavity 390, while allowing the particulates 592 to collect in the collection well 820. The collection well 820 will redirect the airflow 590 at a selected angle such that the airflow 590 will be able to make the turn while the particulates 592 will not be able to make the turn, as shown in FIG. 5. Due to the mass size of the particulate 592, the particulate 592 cannot make the turn from the primary aperture 307 and the momentum of the particulate 592 separates the particulate 592 from the airflow 590 and carries the particulate 592 into the collection well 820. As seen in FIG. 5, the dam 840 extends the collection well 820 away from the second surface 420 and the collection well 820 is configured to redirect the airflow 590 around the dam 840. In an embodiment, the dam 840 may be located at a distance D2 away from the inner surface 610 and the distance D2 is less than or equal to about three times a diameter D3 of the opening 810. In an embodiment, a secondary aperture 309 located proximate the dam 840 may be angled towards the dam 840, as shown in FIG. 5.

Advantageously, by aerodynamically separating out the particulates 592 using the collection well 820, buildup of particulate 592 on the second side 420 of the heat shield panel 400 may be reduced and/or eliminated. Further advantageously, by aerodynamically separating out the particulates 592 using the collection well 820, entry of particulate 592 into the combustion area 370 of the combustion chamber 302 may be reduced and/or eliminated.

Referring now to FIG. 6 with continued reference to FIGS. 1, 2, 3*a*, 3*b*, 4*a*-4*c*, and 5. FIG. 6 shows a particulate capture system 100 for a combustor 300 (see FIG. 1) of a gas turbine engine 20 (see FIG. 1), in accordance with an embodiment of the present disclosure. FIG. 6 illustrates a heat shield panel 400, a combustion liner 600, a heat shield panel particulate capture device 800 attached to the heat shield panel 400, and a combustion liner particulate capture device 500 attached to the combustion liner 600. Airflow 590 along with particulates 592 are directed into the combustion liner particulate capture device 500 from the inner diameter branch 114 and the outer diameter branch 116, as described above. The addition of a combustion liner particulate capture device 500 to the combustion liner 600 may help reduce the amount of particulate 592 entering the impingement cavity 390 and collecting on the second surface 420 of the heat shield panel 400, while the heat shield panel particulate capture device 800 may provide additional protection against particulates 592 from collecting the outer surface 420 of the heat shield panel 400. The heat shield panel particulate capture device 800 may also help reduce the amount of particulate 592 entering into the combustion area 370 of the combustion chamber 302.

The combustion liner 600 may include one or more combustion liner particulate capture devices 500, as seen in FIG. 6. As described above, the combustion liner particulate capture device 500 aerodynamically separates out particulates 592 from the airflow 590 using the collection backstop 540 and directs the airflow 590 through one or more primary aperture 307. In the unlikely event that one or more particulates 592 does not get aerodynamically separated by the collection backstop, then the airflow 590 and the particulates 592 are directed towards the heat shield panel particulate capture device 800 through the impingement cavity 390. As described above, the heat shield panel particulate capture device 800 aerodynamically separates out particulates 592 from the airflow 590 using the collection well 820 and directs the airflow 590 to one or more secondary apertures 307. Advantageously, utilizing a combustion liner particulate capture device 500 in the combustion liner 600 and a heat shield panel particulate capture device 800 in the heat shield panel 400 provides a primary and secondary means of aerodynamic particulate capture in order to help reduce collection of particulates 592 on the heat shield panel 400 and helps reduce entry of particulate 592 into the combustion area 370 of the combustion chamber 302.

Advantageously by combining the combustion liner particulate capture device 500 and the heat shield panel particulate capture device 800, the heat shield panel particulate capture device 800 becomes more effective. The heat shield panel particulate capture device 800 creates a cross flow 590*a* in the impingement cavity 390 that further reduces adherence of particulate 592 on the heat shield panel 400. The cross flow 590*a* is more effective at reducing the adherence of particulate 592 if there is less particulate 592 in the impingement cavity 390. Thus, since the combustion liner particulate capture device 500 is reducing the amount of particulate 592 to make it into the impingement cavity 390, it is also increasing the effectiveness of the crossflow 590*a* produced by the heat shield panel particulate capture device 800.

It is understood that a combustor of a gas turbine engine is used for illustrative purposes and the embodiments disclosed herein may be applicable to applications other than a combustor of a gas turbine engine.

Technical effects of embodiments of the present disclosure include incorporating particulate capture devices into at least one of a heat shield panel surrounding a gas turbine engine combustion area of the combustion chamber and the combustion liner surrounding the heat shield panels to help reduce collection of particulates on the heat shield panel and also help to reduce entry of the particulate into the combustion area of the combustion chamber.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine component assembly, comprising:

a first component having an inner surface, an outer surface opposite the inner surface, and a cooling hole extending from the outer surface to the inner surface through the first component;

a second component having a first surface and a second surface, the inner surface and the second surface defining a cooling channel therebetween in fluid communication with the cooling hole for cooling the second surface of the second component; and a particulate capture device attached to the first component, the particulate capture device being configured to capture airflow and particulate in an airflow path proximate the outer surface of the first component, and aerodynamically separate the airflow from the particulate, and expel the airflow through the cooling hole towards the second surface of the second component, the particulate capture device having a base portion that is recessed from the outer surface of the first component.

2. The gas turbine engine component assembly of claim 1, wherein the particulate capture device attached to the first component further comprises:

a scoop portion projecting outward from the outer surface of the first component and into the airflow path proximate the outer surface of the first component, wherein the scoop portion is configured to capture airflow and particulate flowing through the airflow path and direct the airflow and particulate through a first orifice and into a chamber of the particulate capture device.

3. The gas turbine engine component assembly of claim 2, wherein:

the particulate capture device attached to the first component is shaped to turn the airflow between the first orifice and the cooling hole such that air particulate is forced to separate from the airflow within the chamber.

4. The gas turbine engine component assembly of claim 2, wherein an area of the first orifice is greater than or equal to three times an area of the cooling hole.

5. The gas turbine engine component assembly of claim 2, wherein the cooling hole is located away from the first orifice at a distance less than or equal to three times a height of the first orifice.

6. The gas turbine engine component assembly of claim 1, wherein the particulate capture device further comprises:

a collection well shaped to redirect the airflow such that airflow separates from the particulate and the airflow continues to flow to a cooling hole of the second component.

7. The gas turbine engine component assembly of claim 6, wherein the particulate capture device further comprises:

a dam projecting out from the second surface of the second component, wherein the dam extends the collection well away from the second surface of the second component, and wherein the collection well is configured to redirect the airflow around the dam.

8. A shell of a combustor for use in a gas turbine engine, the shell comprising:

a combustion chamber of the combustor, the combustion chamber having a combustion area;

a combustion liner having an inner surface, an outer surface opposite the inner surface, and a primary aperture extending from the outer surface to the inner surface through the combustion liner;

a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity; and a particulate capture device embedded within the combustion liner, the particulate capture device being configured to capture airflow and particulate in an airflow path proximate the outer surface, aerodynamically separate the airflow from the particulate, and expel the airflow through the primary aperture towards the second surface, wherein the particulate capture device further comprises:

a scoop portion projecting outward from the outer surface of the combustion liner and into the airflow path proximate the outer surface, wherein the scoop portion is configured to capture the airflow and the particulate flowing through the airflow path and direct the airflow and the particulate through a first orifice and into a chamber of the particulate capture device;

a forward end, the first orifice being located at the forward end;

an aft end located opposite the forward end, wherein the forward end is located forward of the aft end;

a collection backstop located at the aft end, wherein the scoop portion is configured to direct the airflow and the particulate from the first orifice towards the collection backstop;

a base portion located opposite the scoop portion, the collection backstop extending from the base portion to the scoop portion; and a front wall located at or proximate the forward end, the front wall, the scoop portion, the base portion, and the collection backstop form the chamber of the combustion liner particulate capture device, wherein the forward end is located forward of an entirety of the primary aperture, wherein the first orifice extends from the forward end of the scoop portion to the outer surface of the combustion liner, and wherein the base portion is oriented at an inclined angle such that at least a portion of the base portion is recessed in the outer surface of the combustion liner, and an aft end of the base portion is closer to the inner surface of the combustion liner than a forward end of the base portion.

* * * * *